(12) United States Patent
Marks

(10) Patent No.: US 9,376,528 B2
(45) Date of Patent: *Jun. 28, 2016

(54) LATENT CATALYST FOR CURABLE COMPOSITIONS

(71) Applicant: Blue Cube IP LLC, Midland, MI (US)

(72) Inventor: Maurice J. Marks, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/391,715

(22) PCT Filed: May 23, 2013

(86) PCT No.: PCT/US2013/042342
§ 371 (c)(1),
(2) Date: Oct. 10, 2014

(87) PCT Pub. No.: WO2013/188071
PCT Pub. Date: Dec. 19, 2013

(65) Prior Publication Data
US 2015/0087748 A1   Mar. 26, 2015

Related U.S. Application Data

(60) Provisional application No. 61/660,389, filed on Jun. 15, 2012.

(51) Int. Cl.
| | | |
|---|---|---|
| C08G 59/24 | (2006.01) |
| C08G 59/62 | (2006.01) |
| C08G 59/68 | (2006.01) |
| C08L 63/00 | (2006.01) |
| C08G 59/02 | (2006.01) |
| C08K 5/00 | (2006.01) |
| C08K 5/053 | (2006.01) |
| C08K 5/42 | (2006.01) |

(52) U.S. Cl.
CPC ............ C08G 59/687 (2013.01); C08G 59/027 (2013.01); C08G 59/245 (2013.01); C08G 59/62 (2013.01); C08L 63/00 (2013.01); C08K 5/0025 (2013.01); C08K 5/053 (2013.01); C08K 5/42 (2013.01)

(58) Field of Classification Search
None
See application file for complete search history.

(56) References Cited

U.S. PATENT DOCUMENTS

| | | | |
|---|---|---|---|
| 2,924,580 A * | 2/1960 | Phillips et al. ................. | 528/408 |
| 6,562,884 B1 * | 5/2003 | Tang et al. .................... | 523/443 |
| 2007/0004871 A1 * | 1/2007 | Lu et al. ........................ | 525/396 |
| 2015/0087749 A1 * | 3/2015 | Marks ........................... | 523/400 |

FOREIGN PATENT DOCUMENTS

| | | | | |
|---|---|---|---|---|
| WO | WO 2011037895 A1 * | 3/2011 | ............. | C08G 59/62 |
| WO | WO2013/070393 | 5/2013 | | |

* cited by examiner

*Primary Examiner* — Michael J Feely
(74) *Attorney, Agent, or Firm* — Polsinelli PC

(57) ABSTRACT

A curable composition including (a) at least one divinylarene dioxide; (b) at least one polyol; and (c) at least one latent cure catalyst.

11 Claims, 2 Drawing Sheets

LATENT CATALYST FOR CURABLE COMPOSITIONS

FIELD

The present invention is related to latent catalysts for curable compositions including a mixture of divinylarene dioxides and polyols.

BACKGROUND

It is known in the art to prepare various curable compositions containing a combination of a divinylarene dioxide, particularly divinylbenzene dioxide (DVBDO), and other compounds that mix with the divinylarene dioxide such as a polyol compound to form a curable composition. Various curing catalysts are also known to be added to the curable compositions containing a divinylarene dioxide and a curing agent to promote the reaction between the divinylarene dioxide and curing agent in forming a cured composition.

Curable compositions comprising divinylarene dioxides and polyols are described in U.S. Provisional Patent Application Ser. No. 61/556,979 and references cited therein, incorporated herein by reference. However, the known catalysts for curing these divinylarene dioxide-polyol reaction mixtures react at relatively low temperatures to cause higher viscosity and/or premature gelling during cure. Some of the known cure catalyst disclosed in the prior art include for example, Bronsted acids and Lewis acids.

SUMMARY

The present invention is directed to a curable composition including a mixture of a divinylarene dioxide, a polyol, and a latent cure catalyst. The curable composition with the latent cure catalyst may be cured at curing conditions to form a cured composition.

In one embodiment, the latent cure catalysts of the present invention for the curable compositions comprising divinylarene dioxides and polyols advantageously provide latency of cure. In addition, the latent catalysts of the present invention advantageously provide curable compositions of divinylarene dioxides and polyols having a longer gel time and a lower minimum viscosity than analogous compositions using prior art catalysts. Latent cure catalysts may include for example esters of sulfonic acids. The latent cure catalysts may also include for example adducts of sulfonic acids and epoxy resins.

In another embodiment, the present invention is directed to a curable composition including (a) a divinylarene dioxide; (b) at least one polyol; and (c) at least one latent cure catalyst, wherein said cure catalyst being effective in catalyzing the reaction between the divinylarene dioxide and the polyol; and wherein said cure catalyst being effective in providing latency of cure to the curable composition.

The curable composition of the present invention including divinylarene dioxides, polyols, and latent cure catalysts are novel formulations which advantageously have longer gel times and lower minimum viscosities than comparable curable compositions of the prior art. In addition, the curable composition of the present invention has a latency of cure; and when the curable composition is cured, the composition cures to form a cured composition.

BRIEF DESCRIPTION OF THE DRAWINGS

For the purpose of illustrating the present invention, the drawings show a form of the present invention which is presently preferred. However, it should be understood that the present invention is not limited to the precise arrangements and instrumentation shown in the drawings.

DETAILED DESCRIPTION

Figure 1:
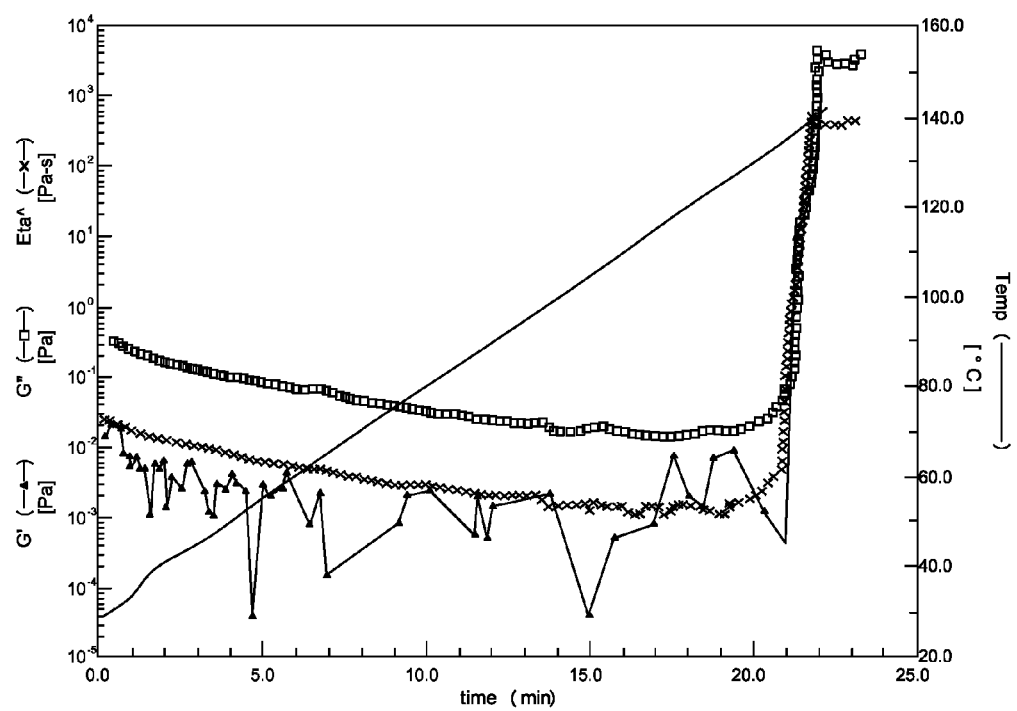
FIG. 1 is a graphical illustration showing the rheological analysis of Example 1.
Figure 2:
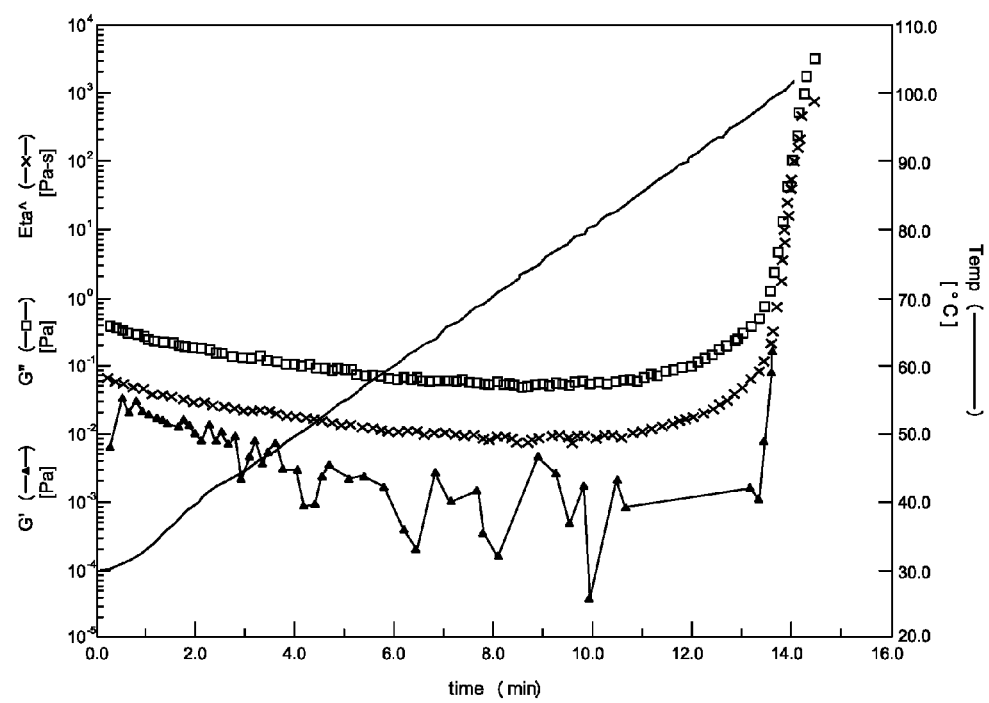
FIG. 2 is a graphical illustration showing the rheological analysis of Comparative Example A.

In its broadest scope, the present invention includes a curable composition comprising a mixture of (a) at least one divinylarene dioxide; (b) at least one polyol; and (c) at least one latent cure catalyst, wherein said cure catalyst being effective in catalyzing the reaction between the divinylarene dioxide and the polyol; and wherein said cure catalyst being effective in providing latency of cure to the curable composition.

"Latency of cure" herein means cure begins at a higher temperature and/or at a longer period of time. For example, the curable composition of the present invention can be cured to form a cured composite or thermoset by exposing the curable composition to elevated temperatures as described below.

The divinylarene dioxide useful in the present invention is as described in WO2011/0251412, incorporated herein by reference.

In one embodiment, the divinylarene dioxide, component (a), useful in preparing the curable composition of the present invention may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, and tetrahydronaphthalene. Homologously bonded (substituted) benzenes may consist of biphenyl, and diphenylether.

The divinylarene dioxide used for preparing the formulations of the present invention may be illustrated generally by general chemical Structures I-IV as follows:

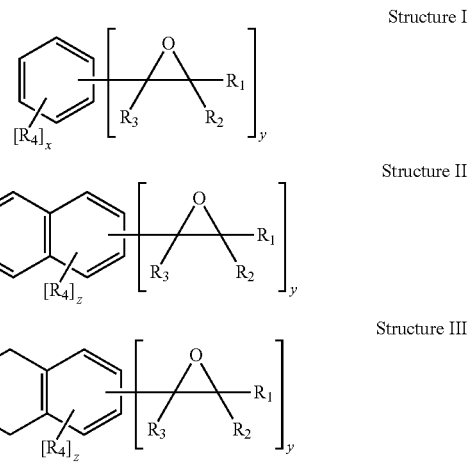

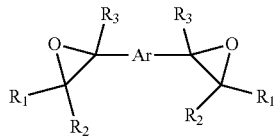

Structure IV

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. Patent Provisional Application Ser. No. 61/141,457, filed Dec. 30, 2008, by Marks et al., incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In one preferred embodiment of the present invention, the divinylarene dioxide used in the epoxy resin formulation may be for example divinylbenzene dioxide (DVBDO). In another preferred embodiment, the divinylarene dioxide component that is useful in the present invention includes, for example, a divinylbenzene dioxide as illustrated by the following chemical formula of Structure V:

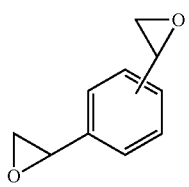

Structure V

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

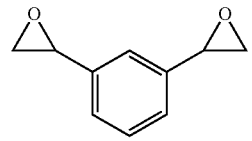

Structure VI

Structure VII below illustrates another embodiment of a preferred chemical structure of the DVBDO useful in the present invention:

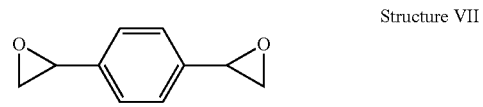 [SMILES: c1cc(C2CO2)ccc1C1CO1]

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment of the present invention, the divinylarene dioxide may contain quantities (such as for example less than 20 wt %) of substituted arenes and/or arene oxides. The amount and structure of the substituted arenes and/or arene oxides depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene oxide while DEB remains unchanged. The presence of these compounds can increase the epoxide equivalent weight of the divinylarene dioxide to a value greater than that of the pure compound.

In one embodiment, the divinylarene dioxide, for example DVBDO, useful in the present invention comprises a low viscosity liquid epoxy resin. For example, the viscosity of the divinylarene dioxide used in the present invention ranges generally from 0.001 Pa-s to 0.1 Pa-s in one embodiment, from 0.01 Pa-s to 0.05 Pa-s in another embodiment, and from 0.01 Pa-s to 0.025 Pa-s in still another embodiment, at 25° C.

Generally, the concentration of divinylarene dioxide used is at stoichiometric balance, or more so, or less so, based on equivalents compared to that of the hydroxyl groups provided by the polyol. For example, generally the equivalent ratio r of epoxide to hydroxyl can be from 0.01 to 100 in one embodiment, from 0.05 to 50 in another embodiment, and from 0.1 to 10 in still another embodiment.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

The polyol useful for the curable composition of the present invention may comprise any conventional polyol known in the art. For example, the polyol may include any conventional polyol known in the art and particularly any compound or mixtures of compounds containing two or more hydroxyl groups. For example, the polyol useful in the curable composition, may be selected from, but are not limited to, diols, glycols, triols, tetrols, pentols, hexols, and mixtures thereof.

In one preferred embodiment, the polyol may include for example alkyl and alkyl ether polyols, polymeric polyols such as polyether polyols, polyester polyols (including polycaprolactone polyols), polycarbonate polyols, and polyalkylidine polyols, and mixtures thereof.

Generally, the concentration of polyol used is at stoichiometric balance, or more so, or less so, based on equivalents compared to that of the epoxide groups. For example, generally the equivalent ratio r of epoxide to hydroxyl can be from 0.01 to 100 in one embodiment, from 0.05 to 50 in another embodiment, and from 0.1 to 10 in still another embodiment.

In preparing the curable resin formulation of the present invention, at least one latent cure catalyst is used to facilitate the reaction of the divinylarene dioxide compound with the polyol. The latent cure catalyst useful in the present invention may include, for example, the catalysts derived from sulfonic acids described in WO 9518168.

In one embodiment, the latent cure catalyst may include for example the esters of sulfonic acids such as methyl p-toluenesulfonate, ethyl p-toluenesulfonate, and methyl methanesulfonate, or any combination thereof.

In another embodiment, the latent cure catalyst may include for example the adducts of sulfonic acids and epoxy resins including the adduct of p-toluenesulfonic acid and bisphenol A diglycidyl ether.

In yet another embodiment, the latent cure catalyst may include for example ammonium salts of sulfonic acids such as ammonium triflate, tetramethylammonium triflate, or any combinations thereof.

In still another embodiment, the latent cure catalyst may include esters of sulfuric acid such as dimethylsulfate, diethylsulfate, or combinations thereof.

Most preferred embodiments of the latent cure catalysts may include methyl p-toluenesulfonate, ethyl p-toluenesulfonate, methyl methanesulfonate, or mixtures thereof.

The concentration of the latent cure catalyst used in the present invention may range generally from 0.01 wt % to 20 wt % in one embodiment, from 0.1 wt % to 10 wt % in another embodiment, from 1 wt % to 10 wt % in still another embodiment, and from 2 wt % to 10 wt % in yet another embodiment.

As an illustration of one embodiment of the composition of the present invention, the composition may comprise a divinylarene dioxide at a concentration of from 1 wt % to 99 wt %, a polyol at a concentration of from 1 wt % to 99 wt %, and a latent cure catalyst at a concentration of from 0.01 wt % to 20 wt %; and cured products derived from the above compositions.

Optional compounds that may be added to the curable composition of the present invention may include, for example, other epoxy resins different from the divinylarene dioxide (e.g., aromatic and aliphatic glycidyl ethers, cycloaliphatic epoxy resins). For example, the epoxy resin which is different from the divinylarene dioxide may be any epoxy resin component or combination of two or more epoxy resins known in the art such as epoxy resins described in Lee, H. and Neville, K., *Handbook of Epoxy Resins*, McGraw-Hill Book Company, New York, 1967, Chapter 2, pages 2-1 to 2-27, incorporated herein by reference.

Suitable other epoxy resins known in the art include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy resin may also be selected from commercially available products such as for example, D.E.R. 331®, D.E.R. 332, D.E.R. 354, D.E.R. 580, D.E.N. 425, D.E.N. 431, D.E.N. 438, D.E.R. 736, or D.E.R. 732 epoxy resins available from The Dow Chemical Company.

Generally, the amount of other epoxy resin, when used in the present invention, may be for example, from 0 equivalent % to 99 equivalent % in one embodiment, from 0.1 equivalent % to 95 equivalent % in another embodiment; from 1 equivalent % to 90 equivalent % in still another embodiment; and from 5 equivalent % to 80 equivalent % of the total epoxides in yet another embodiment.

Another optional compound useful for the curable composition of the present invention may comprise any conventional curing agent known in the art. The curing agent, (also referred to as a hardener or cross-linking agent) useful in the curable composition, may be selected, for example, from those curing agents well known in the art including, but are not limited to, anhydrides, carboxylic acids, amine compounds, phenolic compounds, polymercaptans, or mixtures thereof.

Examples of optional curing agents useful in the present invention may include any of the co-reactive or catalytic curing materials known to be useful for curing epoxy resin based compositions. Such co-reactive curing agents include, for example, polyamine, polyamide, polyaminoamide, dicyandiamide, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and phenolics are preferred. Still another class of optional curing agents useful in the compositions of the present invention includes anhydrides and mixtures of anhydrides with other curing agents.

Generally, the amount of optional curing agent, when used in the present invention, may be for example, from 0 equivalent % to 99 equivalent % in one embodiment, from 0.1 equivalent % to 90 equivalent % in another embodiment; from 1 equivalent % to 75 equivalent % in still another embodiment; and from 5 equivalent % to 50 equivalent % of the total curing agent functional groups (polyol and optional curing agent) in yet another embodiment.

Other optional components that may be useful in the present invention are components normally used in resin formulations known to those skilled in the art. For example, the optional components may comprise compounds that can be added to the composition to enhance application properties (e.g. surface tension modifiers or flow aids), reliability properties (e.g. adhesion promoters), and/or the catalyst lifetime.

An assortment of other additives may be added to the compositions or formulations of the present invention including for example, other curing agents, fillers, pigments, toughening agents, flow modifiers, other resins different from the epoxy resins and the divinylarene dioxide, diluents, stabilizers, fillers, plasticizers, catalyst de-activators, a halogen containing or halogen free flame retardant; a solvent for processability including for example acetone, methyl ethyl ketone, an Dowanol PMA; adhesion promoters such as modified organosilanes (epoxidized, methacryl, amino), acetylacetonates, or sulfur containing molecules; wetting and dispersing aids such as modified organosilanes; a reactive or non-reactive thermoplastic resin such as polyphenylsulfones, polysulfones, polyethersolufones, polyvinylidene fluoride, polyetherimide, polypthalimide, polybenzimidiazole, acrylics, phenoxy, urethane; a mold release agent such as waxes; other functional additives or pre-reacted products to improve polymer properties such as isocyanates, isocyanurates, cyanate esters, allyl containing molecules or other ethylenically unsaturated compounds, and acrylates and mixtures thereof.

The concentration of the optional additives useful in the present invention may range generally from 0 wt % to 90 wt % in one embodiment, from 0.01 wt % to 80 wt % in another embodiment, from 0.1 wt % to 65 wt % in still another embodiment, and from 0.5 wt % to 50 wt % in yet another embodiment.

The process for preparing an epoxy formulation or composition includes blending (a) at least one divinylarene dioxide; (b) at least one polyol; (c) at least one latent cure catalyst; and (d) optionally, other ingredients as needed. For example, the preparation of the curable epoxy resin formulation of the present invention is achieved by blending with or without vacuum in a Ross PD Mixer (Charles Ross), a divinylarene dioxide, a polyol, a cure catalyst, and optionally any other desirable additives. Any of the above-mentioned optional assorted formulation additives, for example an additional epoxy resin, may also be added to the composition during the mixing or prior to the mixing to form the composition.

All the components of the epoxy resin formulation are typically mixed and dispersed at a temperature enabling the preparation of an effective epoxy resin composition having the desired balance of properties for a particular application. For example, the temperature during the mixing of all components may be generally from −10° C. to 100° C. in one embodiment, and from 0° C. to 50° C. in another embodiment. Lower mixing temperatures help to minimize reaction of the resin and polyol components to maximize the pot life of the formulation.

The blended compound is typically stored at sub-ambient temperatures to maximize shelf life. Acceptable temperature ranges are for example from −100° C. to 25° C. in one embodiment, from −70° C. to 10° C. in another embodiment, and from −50° C. to 0° C. in still another embodiment. As an illustration of one embodiment, the temperature at which the blended formulation is stored may be 0° C.

The blended formulation can then be applied via a number of methods depending on the application. For example, typical application methods include casting, injection molding, extrusion, rolling, and spraying.

Compared to curable compositions of the prior art, the curable compositions of the present invention have longer shelf life by virtue of the use of the latent cure catalyst.

The curing of the curable composition may be carried out at a predetermined temperature and for a predetermined period of time sufficient to cure the composition and the curing may be dependent on the components used in the formulation.

The curable composition advantageously cures at a temperature of between 50° C. and 200° C. in one embodiment, from 75 to 175° C. in another embodiment, and from 100 to 150° C. in still another embodiment.

The curing time period of the curable composition is beneficially within 24 hours in one embodiment, from 0.1 hour to 24 hours in another embodiment, and from 0.2 hour to 12 hours in still another embodiment.

The curing of the curable composition may be carried out at a predetermined temperature and for a predetermined period of time sufficient to cure the composition and the curing may be dependent on the hardeners used in the formulation. For example, the temperature of curing the formulation may be generally from 50° C. to 200° C. in one embodiment; from 75° C. to 175° C. in another embodiment; and from 100° C. to 150° C. in still another embodiment; and generally the curing time may be chosen between 1 minute to 24 hours in one embodiment, between 5 minutes to 12 hours in another embodiment, and between 10 minutes to 6 hours in still another embodiment. Below a period of time of 1 minute, the time may be too short to ensure sufficient reaction under conventional processing conditions; and above 24 hours, the time may be too long to be practical or economical.

The curable compositions of the present invention have a lower minimum viscosity compared to compositions of the prior art. The minimum viscosity of a curable composition is determined by measuring the viscosity as a function of increasing temperature. The viscosity of a curable composition typically first decreases with increasing temperature and then increases with increasing temperature as the curing reaction(s) occur until the gel point is reached. At the gel point the viscosity is infinite and the curable composition no longer flows without being stressed. The relative minimum viscosity and the relative gel point of the curable compositions of the present invention are defined herein as the ratios of the minimum viscosity or gel point values of the curable composition of the present invention and those of an analogous formulation using a prior art catalyst.

The curable compositions of the present invention using a latent cure catalyst have a relative minimum viscosity from 0.9 to 0.01 in one embodiment, and from 0.8 to 0.05 in another embodiment, and from 0.7 to 0.1 in still another embodiment compared to an analogous curable composition using a prior art catalyst. The curable compositions of the present invention using a latent cure catalyst have a relative gel time from 1.1 to 100 in one embodiment, from 1.2 to 50 in another embodiment, and from 1.3 to 25 in still another embodiment.

The curable compositions of the present invention using a latent cure catalyst have an increase of viscosity upon storage at 25° C. of less than a factor of 10 in one embodiment, less than factor of 9 in another embodiment, less than a factor of 8 in still another embodiment, less than a factor of 7 in yet another embodiment, and less than a factor of 6 in even still another embodiment compared to an analogous curable composition using a prior art catalyst.

The divinylarene dioxide of the present invention such as divinylbenzene dioxide (DVBDO), which is the epoxy resin component of the curable composition of the present invention, may be used as the sole resin to form the epoxy matrix in the final formulation; or the divinylarene dioxide resin may be used in combination with another epoxy resin that is different from the divinylarene dioxide as the epoxy component in the final formulation. For example the different epoxy resin may be used as an additive diluent.

In one embodiment, the use of divinylbenzene dioxide such as DVBDO imparts improved properties to the curable composition and the final cured product over conventional glycidyl ether, glycidyl ester or glycidyl amine epoxy resins. The DVBDO's unique combination of low viscosity in the uncured state, and high Tg after cure due to the rigid DVBDO molecular structure and increase in cross-linking density enables a formulator to apply new formulation strategies. In addition, the ability to cure the epoxy resin with an expanded hardener range, offers the formulator significantly improved formulation latitude over other types of epoxy resins such as epoxy resins of the cycloaliphatic type resins (e.g., ERL-4221, formerly from The Dow Chemical Company).

As is well known in the art, curable compositions are converted upon curing from a liquid, paste, or powder formulation into a durable solid cured composition. The resulting cured composition of the present invention displays such excellent properties, such as, for example, surface hardness. The properties of the cured compositions of the present invention may depend on the nature of the components of the curable formulation.

In one preferred embodiment, the cured compositions of the present invention exhibit a Shore A hardness value of from 5 to 100, from 10 to 100 in another embodiment, and from 20 to 100 in yet another embodiment. In another preferred embodiment, the cured compositions of the present invention exhibit a Shore D hardness value of from 5 to 100, from 10 to 100 in another embodiment, and from 20 to 100 in yet another embodiment.

The curable composition of the present invention may be used to manufacture coatings, films, adhesives, binders, sealants, laminates, composites, electronics, and castings.

EXAMPLES

The following examples and comparative examples further illustrate the present invention in detail but are not to be construed to limit the scope thereof.

Various terms and designations used in the following examples are explained herein below:

"DVBDO" stands for divinylbenzene dioxide having an epoxide equivalent weight of 83 g/eq.

"MPTS" stands for methyl p-toluenesulfonate.

"MMS" stands for methyl methanesulfonate.

Cycat 600 is dodecylbenzenesulfonic acid (70 wt. % dodecylbenzenesulfonic acid in isopropanol), commercially available from Cytec, Inc.

Voranol 225 is a poly(propylene oxide) polyol from The Dow Chemical Company having a hydroxyl equivalent weight of 83 g/eq.

The following standard analytical equipments and methods are used in the Examples:

Glass Transition Temperature (Tg) Measurements

In the following examples glass transition temperature ($T_g$) is measured by differential scanning calorimetry (DSC) using a temperature scan rate of 10° C./minute and r is the ratio of epoxide/polyol equivalents in the formulation.

Gel Time Measurements

Rheological analyses were done on a TA Instruments ARES rheometer fitted with a parallel plate fixture using a temperature sweep method at 5° C./minute. Viscosity, shear storage modulus (G'), and shear loss modulus (G") is determined as a function of time and temperature. The gel point by this analysis is defined as the time at which G'=G".

Shore D Hardness Measurements

Shore hardness is determined using ASTM D2240 using a Type D durometer from Shore-Instron Inc.

Example 1 and Comparative Example A

Mixtures of 2.5 g DVBDO (0.03 eq.), 2.5 g Voranol 225 (0.03 eq., r=1.0), and 0.1 g (2 wt %) of the catalyst (MPTS or Cycat 600) shown in Table I were stirred until homogeneous; and then aliquots of the mixtures were subjected to rheological analysis on a TA Instruments ARES rheometer fitted with a parallel plate fixture using a temperature sweep method at 5° C./minute.

TABLE I

Rheology Data

| Example | Catalyst | Minimum Viscosity (mPa-s) | Gel Time (minutes) | FIG. No. |
|---|---|---|---|---|
| Example 1 | MPTS | 4 | 21.3 | 1 |
| Comparative Example A | Cycat 600 | 8 | 14.3 | 2 |

In Table I above, Example 1 shows improved processability using the latent MPTS catalyst compared to a prior art catalyst in an analogous formulation. The results of Example 1 and Comparative Example A illustrate a relative minimum viscosity of 0.5 and a relative gel time of 1.5 for the composition of the present invention.

Examples 2 and 3 and Comparative Examples B and C

Mixtures of 2.0 g DVBDO (0.02 eq.), 2.0 g Voranol 225 (0.02 eq., r=1.0), and 0.05 g (1.25 wt %) of the catalyst (MPTS, MMS, or Cycat 600) shown in Table II were stirred until homogeneous, poured into an aluminum dish, and cured in an air-recirculating oven. The respective cure schedules of the mixtures and the respective properties of the resulting thermosets are shown in Table II.

TABLE II

Curing Schedule and Thermoset Properties

| Example | Catalyst | Cure Schedule | $T_g$ (° C.) | Hardness (Shore D) |
|---|---|---|---|---|
| Example 2 | MPTS | 1 hour @ 100° C. | 24 | 70 |
| Example 3 | MMS | 2 hours @ 100° C. | 31 | 77 |
| Comparative Example B | Cycat 600 | 1 hour @ 100° C. | foamed, no analysis | |
| Comparative Example C | Cycat 600 | 30 minute each @ 60° C., 70° C., 80° C., 90° C., and 100° C. | 28 | 78 |

In Table II above, Examples 2 and 3 show the latent catalysts MPTS and MMS effectively cure the DVBDO-Voranol 225 mixture without foaming. In addition, Examples 2 and 3 provide a thermoset product with thermoset properties similar a thermoset prepared from the prior art catalyst (Comparative Example B), except that Examples 2 and 3 use a simpler cure schedule.

Example 4 and Comparative Example D

Mixtures of 20.6 g Voranol 225, 0.8 g catalyst (Table III), and 20.0 g DVBDO were prepared with magnetic stirring.

The formulations were stored at room temperature (22° C.-25° C.) and their viscosity was measured daily at 25° C. using an AR 2000 rheometer.

TABLE III

Viscosity of DVBDO-Voranol 225-Catalyst Formulations

| Example | Catalyst | Viscosity (Pa-s) | | | |
|---|---|---|---|---|---|
| | | Day 1 | Day 2 | Day 3 | Day 4 |
| Comparative Example D | Cycat 600 | 0.138 | 0.892 | 9.52 | 131.20 |
| Example 4 | MPTS | 0.081 | 0.077 | 0.082 | 0.085 |

In Table III above, the room temperature reactivity of the prior art catalyst Cycat 600 (Comparative Example D) results in an approximately 6-fold increase in viscosity over 1 day and 100-fold increase in viscosity over three days, whereas the room temperature stability of the latent catalyst MPTS of the present invention (Example 4) provides no change in viscosity over the same period.

The invention claimed is:

1. A curable composition comprising: (a) at least one divinylarene dioxide; (b) at least one polyol; and (c) at least one latent cure catalyst selected from the group consisting of methyl p-toluenesulfonate and methyl methanesulfonate.

2. The composition of claim 1, wherein the at least one divinylarene dioxide comprises divinylbenzene dioxide.

3. The composition of claim 1, wherein the at least one polyol is selected from the group consisting of at least one diol, at least one glycol, at least one triol, at least one tetrol, at least one pentol, at least one hexol, at least one polyether polyol, at least one polyester polyol, at least one polycarbonate polyol, at least one polyalkylidine polyol, and mixtures thereof.

4. The composition of claim 1, wherein the at least one divinylarene dioxide and the at least one polyol are present in amounts yielding an equivalent ratio of from 0.01 to 100.

5. The composition of claim 4, wherein the at least one divinylarene dioxide and the at least one polyol are present in amounts yielding an equivalent ratio of from 0.1 to 10.

6. The composition of claim 1, wherein the at least one latent cure catalyst is present in an amount of from 0.01 weight percent to 20 weight percent, based on the overall composition.

7. The composition of claim 1, wherein the viscosity of the composition increases by less than a factor of about 6 over a period of 1 day at 25° C.

8. The composition of claim 1, further comprising a filler, a reactive diluent, a flexibilizing agent, a processing aide, a toughening agent, or a mixture thereof.

9. A process for preparing the curable composition according to claim 1 comprising: admixing (a), (b), and (c).

10. A process for preparing a cured composition comprising curing the composition of claim 1.

11. A cured article prepared by the process of claim 10.

* * * * *